United States Patent
Arkin et al.

(10) Patent No.: US 11,060,879 B2
(45) Date of Patent: Jul. 13, 2021

(54) METHOD, SYSTEM, AND COMPUTER PROGRAM PRODUCT FOR GENERATING SYNTHETIC DEMAND DATA OF VEHICLE RIDES

(71) Applicant: HERE GLOBAL B.V., Eindhoven (NL)

(72) Inventors: Ya'ara Arkin, Raanana (IL); Oren Elisha, Raanana (IL); Yam Kaspi, Raanana (IL); Artiom Lapshin, Raanana (IL)

(73) Assignee: HERE Global B.V., Eindhoven (NL)

( * ) Notice: Subject to any disclaimer, the term of this patent is extended or adjusted under 35 U.S.C. 154(b) by 185 days.

(21) Appl. No.: 16/290,589

(22) Filed: Mar. 1, 2019

(65) Prior Publication Data

US 2020/0278214 A1 Sep. 3, 2020

(51) Int. Cl.
*G01C 21/36* (2006.01)
*G01C 21/34* (2006.01)
*G05D 1/00* (2006.01)

(52) U.S. Cl.
CPC ..... *G01C 21/3617* (2013.01); *G01C 21/3438* (2013.01); *G01C 21/3697* (2013.01); *G05D 1/0027* (2013.01); *G05D 2201/0213* (2013.01)

(58) Field of Classification Search
CPC ................................................ G01C 21/3617
See application file for complete search history.

(56) References Cited

U.S. PATENT DOCUMENTS

| | | | | |
|---|---|---|---|---|
| 8,977,496 | B2* | 3/2015 | Ulloa Paredes | G06Q 50/30 701/533 |
| 9,638,537 | B2* | 5/2017 | Abramson | G01C 21/3626 |
| 9,843,897 | B1* | 12/2017 | Lin | G06Q 50/10 |
| 10,458,806 | B2* | 10/2019 | Chen | G06F 16/29 |
| 10,692,028 | B2* | 6/2020 | Liu | G06Q 10/06315 |
| 2017/0109764 | A1* | 4/2017 | Tripathi | G06Q 30/0202 |
| 2018/0018572 | A1* | 1/2018 | Wang | G06Q 50/30 |

(Continued)

OTHER PUBLICATIONS

Jager et al., "Analyzing and Modeling a City's Spatiotemporal Taxi Supply and Demand: a Case Study for Munich", published in Journal of Traffic and Logistics Engineering, vol. 4, No. 2, Dec. 26, 2016, pp. 147-153.

(Continued)

*Primary Examiner* — Michael A Berns
(74) *Attorney, Agent, or Firm* — Ditthavong, Steiner & Mlotkowski (57) ABSTRACT

The present invention provides a method, apparatus, and computer program product for generating synthetic demand data of vehicle rides corresponding to a first location. The method comprises obtaining historic demand data of vehicle rides corresponding to a second location. The historic demand data comprises at least one first point of interest (POI) associated with at least one of a pick-up event or a drop-off event. The method further comprises retrieving map data associated with the second location and further, determining at least one second POI associated with the first location. The method further comprises generating the synthetic demand data of vehicle rides corresponding to the first location, based on the at least one first POI, the map data, and the at least one second POI.

20 Claims, 5 Drawing Sheets

(56) References Cited

U.S. PATENT DOCUMENTS

2019/0292720 A1* 9/2019 Lin .................... C23C 14/14
2020/0279491 A1* 9/2020 Elisha ................ G08G 1/207

OTHER PUBLICATIONS

Qi et al., "Analysis and Prediction of Regional Mobility Patterns of Bus Travellers Using Smart Card Data and Points of Interest Data", published in IEEE Transactions on Intelligent Transportation Systems, Jun. 7, 2018, pp. 1-18.
Uppoor et al., "Generation and Analysis of a Large-scale Urban Vehicular Mobility Dataset", Published in IEEE Transactions on Mobile Computing, vol. 13, Issue 5, May 2014, pp. 1-14.
Zheng, "Modeling Taxi's Dynamic Behavior in Uncertain Urban Environments", published Jan. 30, 2018, 195 pages.

* cited by examiner

METHOD, SYSTEM, AND COMPUTER PROGRAM PRODUCT FOR GENERATING SYNTHETIC DEMAND DATA OF VEHICLE RIDES

FIELD OF THE PRESENT DISCLOSURE

An example embodiment of the present invention generally relates to fleet management applications, and more particularly relates to a method, apparatus, and computer programmable product for generating synthetic demand data of vehicle rides in a city.

BACKGROUND

Fleet management is an important area in the transportation and logistics industry. The technologies behind fleet management can be as simple as Global Positioning System (GPS) transponders in vehicles. There are robust sensors in vehicles of transport service systems, which are in communication with vehicles' embedded systems to relay information. All of that information is relayed back to the distribution centers of the transport service systems through wireless networks where analyzing tool processes that information to maximize delivery efficiency, reduce costs for the vendor and optimize the customers. The dual nature of the transport service systems, pickup and delivery, adds some complexity to managing the fleet. Optimizing routes, delivery and pickup times all have to be managed to avoid running empty vehicles. Fleet management intersects all these factors in creating competitive advantage. One of the primary factors leading to efficient fleet management is demand prediction. Considering this fact, the existing prior arts don't provide an efficient solution for demand prediction issue for a place of which no previous record of vehicle ride is known. Accordingly, there is a need for an efficient system for providing vehicle ride demand corresponding to the place at which previous record of vehicle ride is not known.

SUMMARY

A method, system, and computer program product are provided in accordance with an example embodiment described herein for generating synthetic demand data of vehicle rides corresponding to a first location.

In one aspect, a method for generating synthetic demand data of vehicle rides corresponding to a first location is disclosed. The method comprises obtaining historic demand data of vehicle rides corresponding to a second location, wherein the historic demand data comprises at least one first point of interest (POI) associated with at least one of a pick-up event or a drop-off event, retrieving map data associated with the second location, determining by a processor, at least one second POI associated with the first location and generating by the processor, the synthetic demand data of vehicle rides corresponding to the first location, based on the at least one first POI, the map data, and the at least one second POI, wherein the synthetic demand data comprises at least one of first pick-up data of a first plurality of pick-up events or first drop-off data of a first plurality of drop off events at the first location.

In another aspect, a system to generate synthetic demand data of vehicle rides corresponding to a first location is disclosed. The system comprises at least one non-transitory memory configured to store computer program code instructions and at least one processor configured to execute the computer program code instructions to: obtain historic demand data of vehicle rides corresponding to a second location, wherein the historic demand data comprises at least one first point of interest (POI) associated with at least one of a pick-up event or a drop-off event; retrieve map data associated with the second location. The at least one processor is further configured to determine at least one second POI associated with the first location and generate the synthetic demand data of vehicle rides corresponding to the first location, based on the at least one first POI, the map data, and the at least one second POI, wherein the synthetic demand data comprises at least one of first pick-up data of a first plurality of pick-up events or first drop-off data of a first plurality of drop off events at the first location.

In yet another aspect, a non-transitory computer-readable medium having stored therein, computer-executable instructions for causing a computer to execute operations for generating synthetic demand data of vehicle rides corresponding to a first location is disclosed. The operations comprise obtaining historic demand data of vehicle rides corresponding to a second location, wherein the historic demand data comprises at least one first point of interest (POI) associated with at least one of a pick-up event or a drop-off event, retrieving map data associated with the second location, determining at least one second POI associated with the first location, and generating the synthetic demand data of vehicle rides corresponding to the first location, based on the at least one first POI, the map data, and the at least one second POI, wherein the synthetic demand data comprises at least one of first pick-up data of a first plurality of pick-up events or first drop-off data of a first plurality of drop off events at the first location.

According to some embodiments, the historic demand data is analyzed by the processor, based on a clustering algorithm for generating the synthetic demand data.

According to some embodiments, the clustering algorithm is KNN algorithm.

According to some embodiments, the historic demand data further includes time stamp and geographic location of the at least one first point of interest (POI) associated with the at least one of a pick-up event or a drop-off event.

According to some embodiments, the historic demand data is clustered based on a time stamp of the at least one first POI and a category of the at least one first POI to obtain a plurality of clusters of the historic demand data and the first location is assigned to at least one of the plurality of clusters based on an identifier of the first location.

According to some embodiments, ride data of at least one vehicle ride is generated based on the generated synthetic demand data.

According to some embodiments, destination data of the at least one vehicle ride is determined based on a destination cluster from the plurality of clusters of the historic demand data and a site of the at least one second POI associated with the first location, wherein the site is associated with the destination cluster.

According to some embodiments, route data of the at least one vehicle ride, corresponding to one or more scenarios, is generated.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "user equipment" may be used to refer to any user accessible device such as a mobile phone, a smartphone, a portable computer, and the like that is portable in itself or as a part of another portable object.

The term "historic demand data" may be used to refer to data associated with pickup and/or drop-off events, including timestamps and geographic locations of an old city whose vehicle ride data is known.

The term "synthetic demand data" may be used to refer to data associated with pickup and/or drop-off events, including timestamps and geographic locations of a new city whose vehicle ride data is not known.

The term "points of interest" may be used to refer to venues such as schools, office buildings, restaurants, hospitals, train stations, entertainment venues, sporting venues, and like.

The term "GIS data" of a location may be used to refer to geocoordinates of the location.

The term "pick-up location" may be used to refer to a location corresponding to origin of a vehicle ride.

The term "drop-off location" may be used to refer to a location corresponding to destination of a vehicle ride The term "vehicle ride features" may be used to refer to features such as time-stamp associated with a drop-off location/pick-up location and the like.

The term "transition matrix" may refer to probability of a vehicle to transit from one cluster to another for any given time.

End of Definitions

Traditionally, fleet optimization has been achieved by a combination of efficient route design, real-time information obtainment and vehicle management. Tracking vehicles through GPS technology and plotting that information on a Geographic Information System (GIS) that layers pickup and delivery locations can optimize route design on the fly. However, efficient route design by obtaining real time information is only applicable for the cases in which the vehicles have traveled across the places, routes. There may be a number of places of which vehicle ride information may not be available in the data centers of the transport service systems. Efficient route design seems to be difficult in such cases by the transport service providers.

A method, system, and computer program product are provided herein in accordance with an example embodiment for generating synthetic demand data of vehicle rides corresponding to a first location. In some example embodiments, the method, system, and computer program product provided herein may also be used for determining synthetic demand data of vehicle rides under different scenarios. In some example embodiments, the method, system, and computer program product provided herein may also be used for navigating a user to a location associated with high vehicle ride demand. The user may be a traveler, a rider, a pedestrian, a cab driver and the like who may be stationary or in motion with respect to a road.

Figure 1:
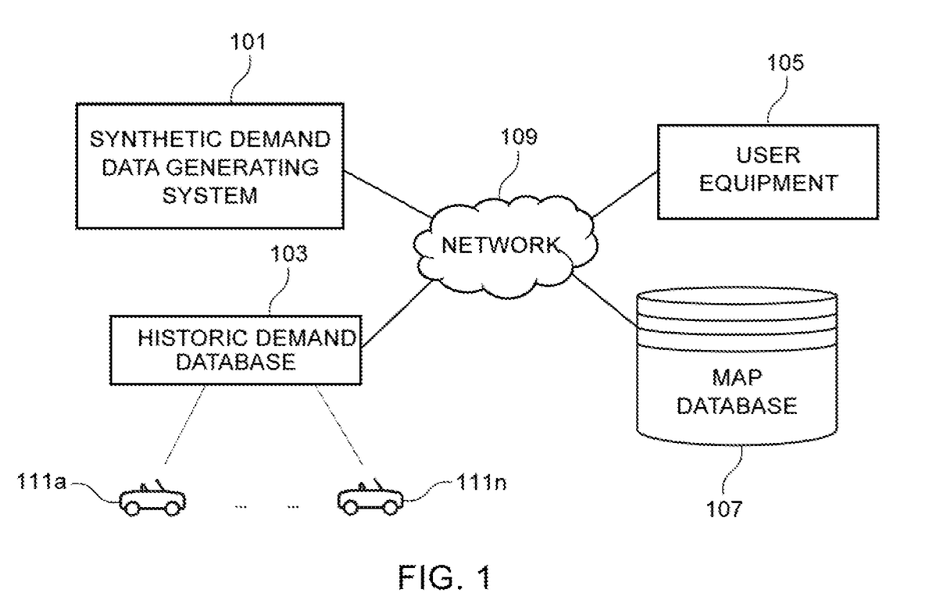
FIG. 1 illustrates a schematic block diagram of a communication environment of a synthetic demand data generating system, in accordance with one or more example embodiments.

FIG. 1 illustrates a schematic block diagram of a communication diagram, in accordance with one or more example embodiments. In the exemplary communication diagram 100 of FIG. 1, a synthetic demand data generating system 101 may be communicatively coupled to a historic demand database 103, a user equipment 105, a map database 107 over a communication network 109. The communication network 109 may be wired, wireless, or any combination of wired and wireless communication networks, such as cellular, Wi-Fi, internet, local area networks, or the like. The historic demand database 103 may store vehicle ride data of past vehicle rides associated with a second location. The second location may correspond to an old city, where the term 'old city' may mean a place and the past vehicle ride data of which may be available in historic demand database 103. Hereinafter, throughout this disclosure, 'old city' and 'second location' may be interchangeably used to refer to a place as described above. In one or more example embodiments, the old city may include more than one location. The term 'system' may be used to mean the synthetic demand data generating system 201, and hereinafter, the terms 'system' and 'synthetic demand data generating system' may be interchangeably used to mean the synthetic demand data generating system 101.

The vehicle ride data may include pick-up data of one or more pick-up events completed by one or more vehicles (111a-111n) in one or more old cities. The vehicle ride data may further include drop-off data of one or more drop-off events completed by one or more vehicles (111a-111n) in one or more old cities. In context of the present invention, vehicles may mean personal vehicles, shared vehicles, or vehicles for hire with a driver, used by a single passenger or small group of passengers. The vehicles may be allotted by a transport service provider to passengers. The pick-up data and/or the drop-off data may include timestamp and geographical location, (e.g. longitude, latitude) of the pick-up events and drop-off events, respectively. For example, if a passenger boards a car (e.g. 111a) at location 'A' at 11:00 am and gets off the car 111a at location 'B' at 11:52 am, longitude and latitude of location 'A' may be stored in the historic demand database 103 as geographic location of pick-up event of the car 111a. Likewise, the historic demand database 103 may store longitude and latitude of location 'B' as geographic location of location 'B', time '11:00 am' as timestamp of the pick-up event by the car 111a at location 'A', time '11:52 am' as timestamp of the drop-off event of the car 111a at location 'B'. In one or more example embodiments, the synthetic demand data generating system 101 may download the vehicle ride data from the historic demand database 103. In one or more alternative embodiments, the synthetic demand data generating system 101 may directly ingest streams of the vehicle ride data from the one or more vehicles (111a-111n). in near real time.

The synthetic demand data generating system 101 may communicate with the user equipment 105 to obtain at least one second point of interest (POI) data associated with a first location. The first location may correspond to a new city, where the term 'new city' may mean a place, the past vehicle ride data of which may not be available in historic demand database 103. Hereinafter, throughout this disclosure, 'new city' and 'first location' may be interchangeably used to refer to a place as described above. In one or more example embodiments, the new city may include more than one location. In one or more example embodiments, the user equipment 105 may enable a user to provide the at least second POI data through the user interface, which the synthetic demand data generating system 101 may obtain from the user equipment 105. The user equipment 105 may be any user accessible device such as a mobile phone, a smartphone, a portable computer, and the like that is portable in itself or as a part of another portable/mobile object such as a vehicle.

In some example embodiments, the user equipment 105 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In this context, the user may be an autonomous or semi-autonomous vehicle. The user equipment 105 may comprise processing means such as a central processing unit (CPU), storage means such as onboard read only memory (ROM) and random access memory (RAM), acoustic sensors such as a microphone array, position sensors such as a GPS sensor, orientation sensors such as gyroscope, motion sensors such as accelerometer, a display enabled user interface such as a touch screen display, and other components as may be required for specific functionalities of the user equipment 105. For example, the user equipment 105 may be configured to execute and run mobile applications such as a messaging application, a browser application, a navigation application, and the like.

In one or more alternative example embodiments, map data pertaining to the at least second POI data may be available in the map database 101. In these embodiments, the synthetic demand data generating system 101 may obtain the at least one second POI data from the map database 107. The synthetic demand data generating system 101 may further obtain map data associated with the first location and map data associated with the second location from the map database 107. In one or more example embodiments, the at least first POI and the at least second POI may include venues such as some or all of arts-entertainment, college-university, food, nightlife spots, outdoor/recreational, residential (which may be divided into two or more classes indicating the type of residence, e.g., apartments and houses), professional places, shop-service, bus station, general-travel, train-station, hotel, moving-target, rental-car-location, road, and the like.

The map database 107 may store node data, road segment data, link data, point of interest (POI) data, link identification information, heading value records or the like. The map database 107 may also store cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 107 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 107 may also store data about the POIs and their respective locations in the POI records. The map database 107 may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 107 may include event data (e.g., traffic incidents, construction activities, scheduled events, unscheduled events, accidents, diversions etc.) associated with the POI data records or other records of the map database 107. Optionally or additionally, the map database 107 may store 3D building maps data (3D map model of objects) of structures surrounding roads and streets.

The map database 107 may be maintained by a content provider e.g., a map developer. By way of example, the map developer may collect geographic data to generate and enhance the map database 107. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used to generate map geometries directly or through machine learning as described herein.

The map database 107 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 105. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the map database 107 may be a master geographic database, but in alternate embodiments, the map database 107 may be embodied as a client-side map database and may represent a compiled navigation database that may be used in or with end user devices (e.g., the user equipment 105) to provide navigation and/or map-related functions. For example, the map database 107 may be used with the user equipment 105 to provide an end user with navigation features. In such a case, the map database 107 may be downloaded or stored on the user equipment 105.

Figure 2:
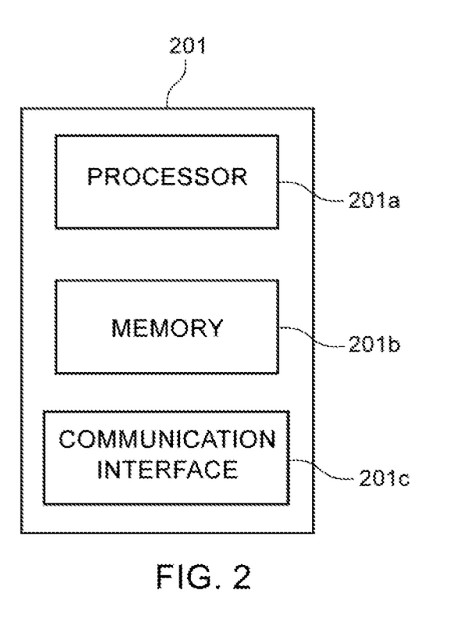
FIG. 2 illustrates a block diagram view of a synthetic demand data generating system, in accordance with one or more exemplary embodiments.

FIG. 2 illustrates a block diagram view of the synthetic demand data generating system 101, in accordance with one or more exemplary embodiments. The synthetic demand data generating system 101 may comprise at least one processor 201a, at least one memory 201b, and a communication interface 201c. Additional, fewer, or different components may also be possible.

The processor 201a may be embodied in a number of different ways. For example, the processor 201a may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201a may include one or more processing cores configured to perform independently. A multi-core processor may enable multiprocessing within a single physical package. Additionally, or alternatively, the processor 201a may include one or more processors configured in tandem via the bus to enable independent execution of instructions, pipelining and/or multithreading.

In some example embodiments, the processor 201a may be configured to provide Internet-of-Things (IoT) related capabilities to users of the system 201 disclosed herein. The IoT related capabilities may in turn be used to provide smart city solutions by providing real time parking updates, big data analysis, and sensor based data collection by using a cloud based mapping platform for providing navigation and parking recommendation services.

The memory 201b may be non-transitory and may include, for example, one or more volatile and/or non-volatile memories. For example, the memory 201b may be an electronic storage device (for example, a computer readable storage medium) comprising gates configured to store data (for example, bits) that may be retrievable by a machine (for example, a computing device like the processor 201a). The memory 201b may be configured to store information, data, content, applications, instructions, or the like, for enabling the apparatus to carry out various functions in accordance with an example embodiment of the present invention. For example, the memory 201b could be configured to buffer input data for processing by the processor 201a. Additionally, or alternatively, the memory 201b could be configured to store instructions for execution by the processor 201a.

The processor 201a (and/or co-processors or any other processing circuitry assisting or otherwise associated with the processor 201a) may be in communication with the memory 201b via a bus for passing information among components of the system 201. The processor 201a may be configured to execute instructions stored in the memory 201b or otherwise accessible to the processor 201a. Additionally, or alternatively, the processor 201a may be configured to execute hard coded functionality. As such, whether configured by hardware or software methods, or by a combination thereof, the processor 201a may represent an entity (for example, physically embodied in circuitry) capable of performing operations according to an embodiment of the present invention while configured accordingly. Thus, for example, when the processor 201a is embodied as an ASIC, FPGA or the like, the processor 201a may be specifically configured hardware for conducting the operations described herein. Alternatively, as another example, when the processor 201a is embodied as an executor of software instructions, the instructions may specifically configure the processor 201a to perform the algorithms and/or operations described herein when the instructions are executed. The processor 201a may include, among other things, a clock, an arithmetic logic unit (ALU) and logic gates configured to support operation of the system 201.

In one embodiment, the processor 201a may comprise user interface circuitry configured to control at least some functions of one or more user interface elements such as a display and, in some embodiments, a plurality of speakers, a ringer, s and/or the like. The processor 201a and/or user interface circuitry comprising the processor 201a may be configured to control one or more functions of one or more user interface elements through computer program instructions (for example, software and/or firmware) stored on the memory 201b accessible to the processor 201a.

The communication interface 201c may comprise input interface and output interface for supporting communications to and from the system 201. The communication interface 201c may be any means such as a device or circuitry embodied in either hardware or a combination of hardware and software that is configured to receive and/or transmit data to/from a communications device in communication with the system 201. In this regard, the communication interface 201c may include, for example, an antenna (or multiple antennae) and supporting hardware and/or software for enabling communications with a wireless communication network. Additionally or alternatively, the communication interface 201c may include the circuitry for interacting with the antenna(s) to cause transmission of signals via the antenna(s) or to handle receipt of signals received via the antenna(s). In some environments, the communication interface 201c may alternatively or additionally support wired communication. As such, for example, the communication interface 201c may include a communication modem and/or other hardware and/or software for supporting communication via cable, digital subscriber line (DSL), universal serial bus (USB) or other mechanisms.

In some example embodiments, the system 201 may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The system 201 may therefore, in some cases, be configured to implement an example embodiment of the present invention on a single "system on a chip." As such, in some cases, a chip or chipset may constitute a means for performing one or more operations for providing the functionalities described herein.

In some example embodiments, the system 201 may communicate with a cloud-based platform via the communication interface 201c to receive a trained data model that corresponds to data regarding candidate patterns of the vehicle ride data of the old city (candidate pattern data). For example, in some example embodiments, the candidate pattern data may be downloaded from the cloud-based platform to the memory 201b through an internet connection. In some example embodiments, the candidate pattern data may be compiled by the cloud-based service provider or a vendor thereof using any suitable means and method. Any suitable training technique may be utilized to build the trained data model. A training process is depicted in an example embodiment of FIG. 4. The system 201 may utilize the trained model to generate synthetic demand data associated with the new city as described in the example embodiment of FIG. 4.

Figure 3:
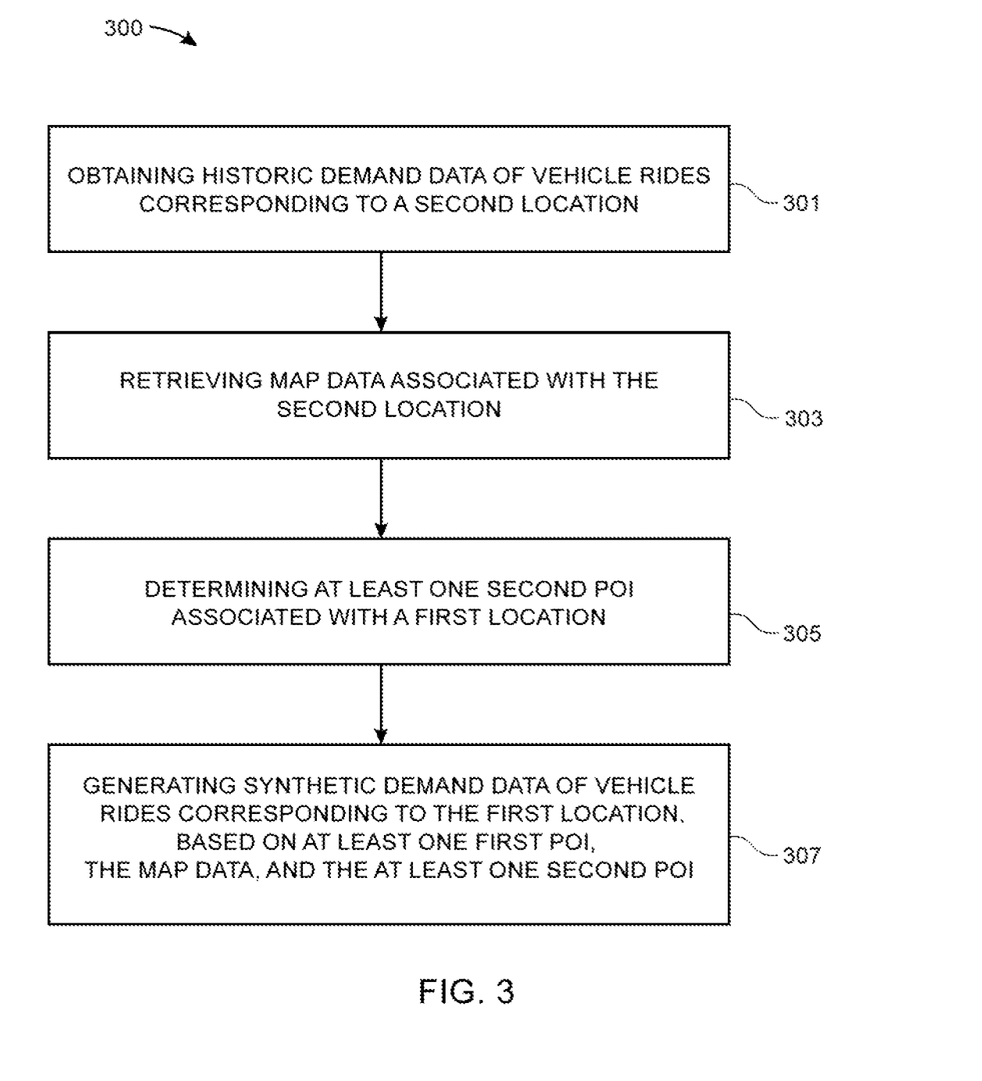
FIG. 3 illustrates a flowchart depicting steps in a method for generating synthetic demand data of vehicle rides of a first location, in accordance with one or more example embodiments.

FIG. 3 illustrates a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 3 illustrates a method 300 for generating synthetic demand data of vehicle rides of the first location, in accordance with one or more example embodiments. The method 300 comprises, at 301, obtaining historic demand data of vehicle rides corresponding to the second location. At step 301, the processor 201a may receive historic demand data of vehicle rides associated with the old city from the historic demand database 103, as mentioned previously. The historic demand data may comprise at least one first point of interest (POI) associated with at least one of a pick-up event or a drop-off event completed in the old city. At step 303, the method 300 includes retrieving map data associated with the second location. In some example embodiments, the processor 201a may receive map data regarding the new city either from the map database 107 in real-time through the communication network 109 at step 303. In some alternative example embodiments, the system 201 may have map data of one or more places including the new city stored in the memory 201b from which the processor 201a may obtain the map data. The method 300 further comprises, at step 305, determining at least one second POI associated with the first location. At step 305, the processor 201a may determine the at least one second POI associated with the first location. Further, the method 300 comprises, at step 307, generating synthetic demand data of vehicle rides corresponding to the first location, based on at least one first POI, the map data, and the at least one second POI. The synthetic demand data comprises at least one of first pick-up data of a first plurality of pick-up events or first drop-off data of a first plurality of drop off events at the first location.

Additionally, various other steps not shown in FIG. 3 may also be included in the method 300. For example, the method 300 may further comprise analyzing, by the processor, the historic demand data based on a clustering algorithm for generating the synthetic demand data. The clustering algorithm may be KNN algorithm. The historic demand data may further include time stamp and geographic location of the at least one first point of interest (POI) associated with the at least one of a pick-up event or a drop-off event. Further, the method 300 may comprise clustering the historic demand data based on a time stamp of the at least one first POI and a category of the at least one first POI to obtain a plurality of clusters of the historic demand data and assigning the first location to at least one of the plurality of clusters based on an identifier of the first location. The method may further comprise generating ride data of at least one vehicle ride, based on the generated synthetic demand data. The method may further include determining destination data of the at least one vehicle ride based on a destination cluster from the plurality of clusters of the historic demand data and a site of the at least one second POI associated with the first location, wherein the site is associated with the destination cluster. Furthermore, the method may further comprise generating route data of the at least one vehicle ride, corresponding to one or more scenarios.

Figure 5:
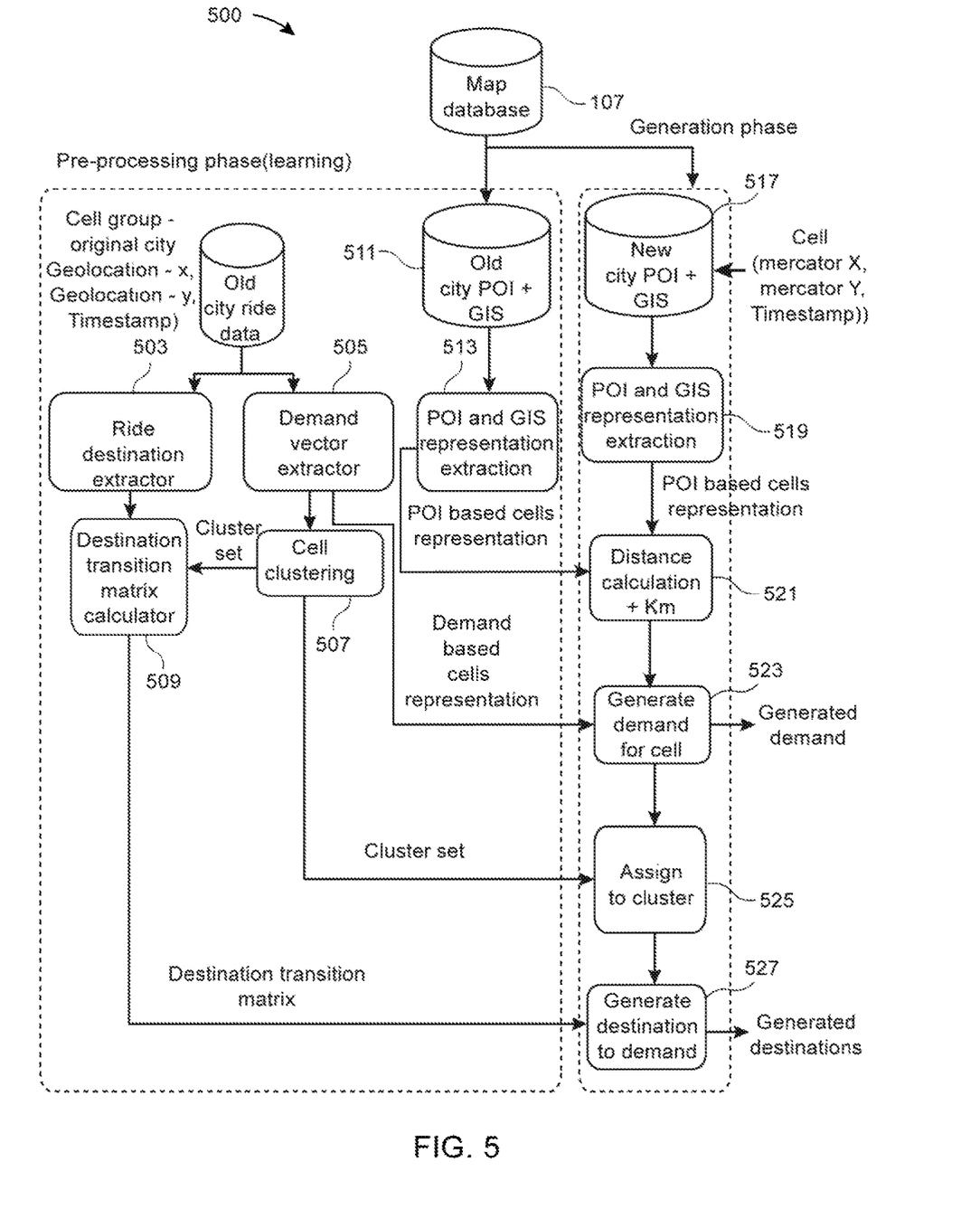
FIG. 5 illustrates a schematic block diagram depicting workflow of the synthetic demand data generating system, in accordance with one or more example embodiments.

In an example embodiment, a system (e.g., the system 201) for performing the method of FIG. 5 above may comprise a processor (e.g., the processor 201a) configured to perform some or each of the operations (301-307) described above. The processor may, for example, be configured to perform the operations (301-307) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 301-307 may comprise, for example, the processor 201a and/or a device or circuit for executing instructions or executing an algorithm for processing information as described above.

On implementing the method 300 disclosed herein, the end result generated by the system 201 is a tangible generation of synthetic demand data of vehicle rides corresponding to a new city. By generating synthetic demand data of vehicle rides, the system 201 may aid in optimization of a taxi service in an area where vehicle ride data of each and every location is not known by taxi service provider of the taxi service.

Figure 4:
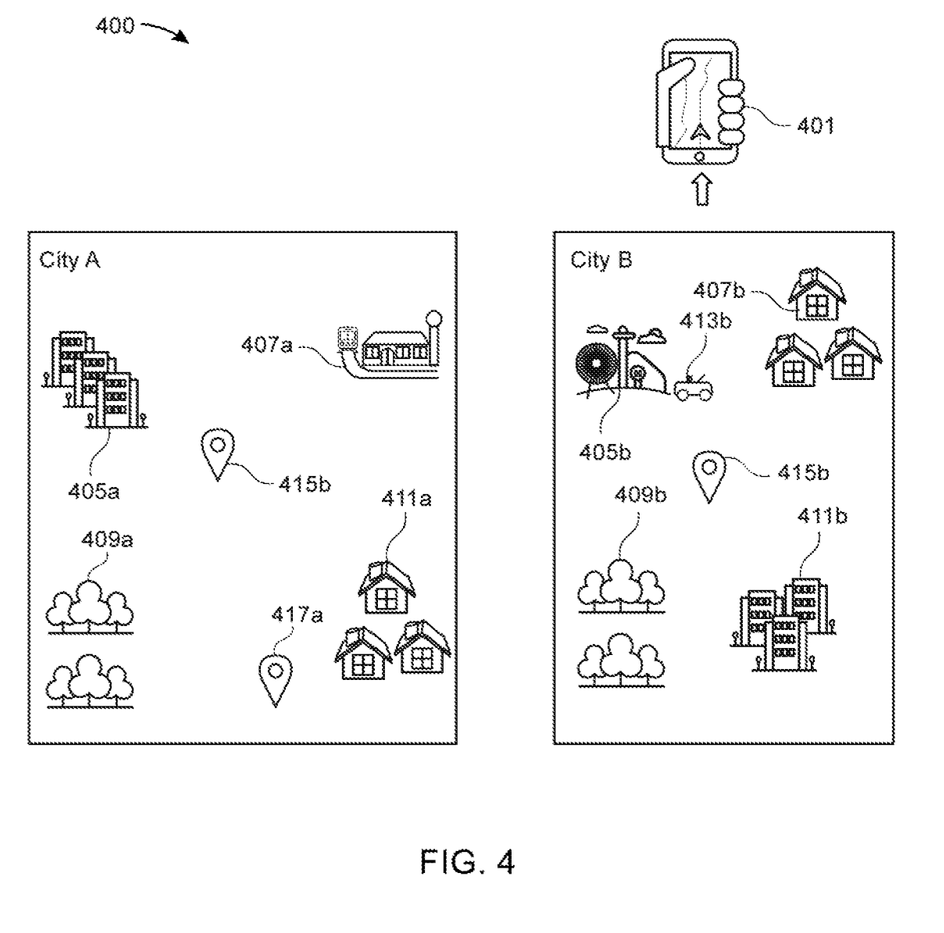
FIG. 4 illustrates an exemplary fleet optimization scenario, in accordance with one or more example embodiments.

FIG. 4 illustrates schematic diagram 400 of an exemplary fleet optimization scenario, in accordance with one more example embodiments. In the schematic diagram 400 of FIG. 4, there may be two cities, city 'A' and city 'B'. City 'A' may correspond to the old city and city 'B' may correspond to the new city. City 'A' may comprise different designated areas, for example, an industrial area 405a, a railway station area 407a, a forest 409a, a residential area 411a and the like. The processor 201a of the system 201 may receive historic demand data of vehicle rides corresponding to city 'A' from the historic demand database 103 through the communication interface 201c. The historic demand data may include first points of interest (POI) (415a, 417a) in city 'A' along with pick-up data of past pick-up events associated with the first POI (415a, 417a) and drop-off data of past drop-off events associated with the first POI (415a, 417a). The processor 201a may retrieve spatial data of city 'A' from the map database 103 and thus, may determine locations of the designated areas 405a-411a.

The pick-up data/drop-off data may include total number of pick-up events/drop-off events at or around the first POI (415a, 417a) along with timestamps and geographic locations of the pick-up events/drop-off events. The historic demand data of city 'A' over a period may provide a consolidated overview of taxi rides occurred in city 'A' during the period. For example, the total number of pick-up events/drop-off events collected for a day may provide an idea regarding which area in city 'A' has received how much taxi ride demand at different durations of the day. The industrial area 405a may have high taxi ride demand of pick-up events during evening and drop-off events during morning, the residential area 411a may have a record of a large number pick-up events during morning and a large number of drop-off events during evening. The forest area 409a may have least number of pick-up events/drop-off events compared to the other areas. The railway station area 407a may have high taxi ride demand during evening and the like.

Further, the processor 201a may obtain spatial data of city 'B' from the map database 103. The city 'B' may comprise various designated areas, for example, an amusement park 405b, a residential area 407b, a forest 409b and an industrial area 411b. The processor may determine locations of designated areas 405b-411b and may determine the at least one second POI 415*b*. Based on the first POI of city 'A', the processor 201*a* may generate synthetic demand data of taxi rides in the city 'B'.

The taxi rides in city 'B' may be scheduled based on the generated synthetic demand data. Among the designated areas as depicted in the schematic diagram 400 of FIG. 4, the amusement park 405*b* may have higher number of drop-off requests during evening and the industrial area 411*b* may have higher number of pick up requests from passengers during evening The generated synthetic demand data may be incorporated in the map database 103 and an updated map may be available for display in a display device 401 The display device 401 may be smartphone, infotainment system of taxi, and the like. Thereby, a taxi driver in city 'B' of the taxi service provider may view the updated map in the display device 401 and plan the taxi ride accordingly. Additionally, in one or more example embodiments, the system 101 may communicate notifications to the display device 401 regarding which area to aim after a completed taxi ride. For example, regarding city 'B', the system 101 may communicate a notification to the display device 401 that a taxi ride may be scheduled to the amusement park 405*b* followed by the industrial area 411*b* during evening.

FIG. 5 illustrates a schematic block diagram depicting workflow of the synthetic demand data generating system 201, in accordance with one or more example embodiments. As shown in the block diagram 500 of FIG. 5, workflow of the synthetic demand data generating system 201 may comprise two phases, a pre-processing phase and a generation phase. In the pre-processing phase, the synthetic demand data generating system 201 may receive historic demand data of vehicle rides and first map data of the old city, and extract required information from the historic demand data and the first map data. In the generation phase, the synthetic demand data generating system 201 may obtain second map data of the new city, may utilize the information extracted in the pre-processing phase, and generate synthetic demand data of the new city. In one or more example embodiments, the first map data may include points of interest (POI) and geographic information system (GIS) data of the old city. The historic demand data may comprise at least one first point of interest (POI) associated with at least one of a pick-up event or a drop-off event completed in the old city. The second map data may include points of interest (POI) and geographic information system (GIS) data of the new city.

According to some embodiments, each of the old city and the new city may be represented as an assembly of a number of cells, where each cell is designed in the map in accordance with any projection method (e.g. Mercator projection). At step 501 of the pre-processing phase, the synthetic demand data generating system 201 may obtain old city ride data from the historic demand database 103. The old city ride data may include information regarding past pick-up events/past drop-off events corresponding to the old city, along with latitudes, longitudes of pick-up locations/drop-off locations and timestamps of the past pick-up events/past drop-off events.

At ride destination extraction 503, the synthetic demand data generating system 201 may extract destination and origin of each ride form old city ride data. At demand vector extraction 505, the synthetic demand data generating system 201 may aggregate the past pick-up events/past drop-off events based on locations (for example, using Mercator projection) and time stamps associated with the past pick-up events/past drop-off events For example, the synthetic demand data generating system 201 may construct a demand vector from "in" (past drop-off events) and "out" (past pick-up vents) counts from each cell in the Mercator projection representation of the old city for a time-frame of one hour. Dimension of the demand vector may be based on average count of the past pick-up events/the past drop-off events for each cell. For example, if dimension of the demand vector is 48:24 in-out features of a cell, the dimension may signify that average amount of drop off events in the cell may be 48. For example, average count of drop off events between 15:00-16:00) and average amount of pick-up events in the cell may 24 for each hour of the day (for example: average count of pick-up events between 15:00-16:00). Additionally, there may be different sets of feature vectors for weekdays and weekends. The synthetic demand data generating system 201 may normalize these vectors to unit length.

Further, at step 507, the synthetic demand data generating system 201 may perform clustering on the historic demand data based on the time stamp and category of the at least one first POI to obtain a plurality of clusters of the historic demand data using a clustering algorithm. A demand vector of 48 in-out features which represents each cell may be used in the clustering algorithm. Each cluster may represent a group of cells with similar vehicle ride features for a day. Further, at step 509, the synthetic demand data generating system 201 may calculate a set of destination transition matrices from the plurality of clusters. Each transition matrix may represent different time period (typically 1 hour). Matrix dimension of each transition matrix may be N×N (N=number of clusters). Each transition matrix may provide probability of a vehicle to transit from one cluster to another for any given time.

Further, at step 511, the synthetic demand data generating system 201 may obtain the points of interest (POI) and geographic information system (GIS) data corresponding to the old city from the map database 107. At step 513, the synthetic demand data generating system 201 may extract a number of POI and GIS representation vectors corresponding to the old city. Each cell (corresponding to the old city, as per Mercator projection) may be represented as a vector in POI space by considering number of POIs in the cell, in each POI category. For example, in cell 'L' of the old city, all the bus stations of the cell 'L' may be represented as a vector. In one or more example embodiments, vector dimension of POI and GIS representation vector may be number of considered POI categories; the representation vector may be normalized. After completing steps 501-513, information extracted by the synthetic demand data generating system 201 may be POI based representation of each cell, demand based representation of each cell, the plurality of clusters and a set of destination transition matrices.

The synthetic demand data generating system 201 may perform various steps in the generation phase based on the information extracted in the pre-processing phase. At step 517, the system 201 may obtain points of interest (POI) and geographic information system (GIS) data of the new city from the map database 107. At step 519, the system 201 may extract a number of POI and GIS representation vectors corresponding to the new city. Further, at step 521, the system 201 may perform distance calculation using KNN algorithm. At this step 521, the system may compute K nearest neighbors from trained vectors for each input vector The term 'trained vectors' may be used to mean POI and GIS representation vectors corresponding to the old city, while 'input vectors' may mean POI and GIS representation vectors corresponding to the new city.

Further, at step 523, the system 201 may generate the synthetic demand data for each cell corresponding to the new city based on the demand of the nearest neighbors. The system 201 may determine ride data for each cell corresponding to the new city based on the generated synthetic demand data. At step 525, the system 201 may assign each cell corresponding to the new city to one of the plurality of clusters based on the KNN algorithm. Each of the K-nearest neighbors computed from the trained vectors may have an identifier. The system 201 may determine mode of the identifiers of the K-nearest neighbors using KNN algorithm. At the final step 527, the system 201 may generate destination data for each generated ride from each cell corresponding to the new city, by sampling a cell out of all the cells corresponding to the new city, based on distance of the sampled cell from a pickup cell and the probability from the cluster transition matrix. The system 201 may identify the pickup cell from all the cells corresponding to the new city based on a distance decay factor. For example, the system 201 may identify a cell associated with shorter ride distance compared to that of other cells as the pickup cell.

In one or more example embodiments, the system 201 may generate demand data for each cell corresponding to the new city under different scenarios. The system may add permutations to the relations between features of each scenario and synthetic demand data, to generate demand data for the different scenarios For example, the system 201 may determine demand data for a holiday by considering vehicle demand patterns similar to that corresponding to weekends, but occurring on week days. For demand data determination for a holiday, the system 201 may analyze primarily vehicle demand patterns for cells containing restaurants and the like.

Figure 6:
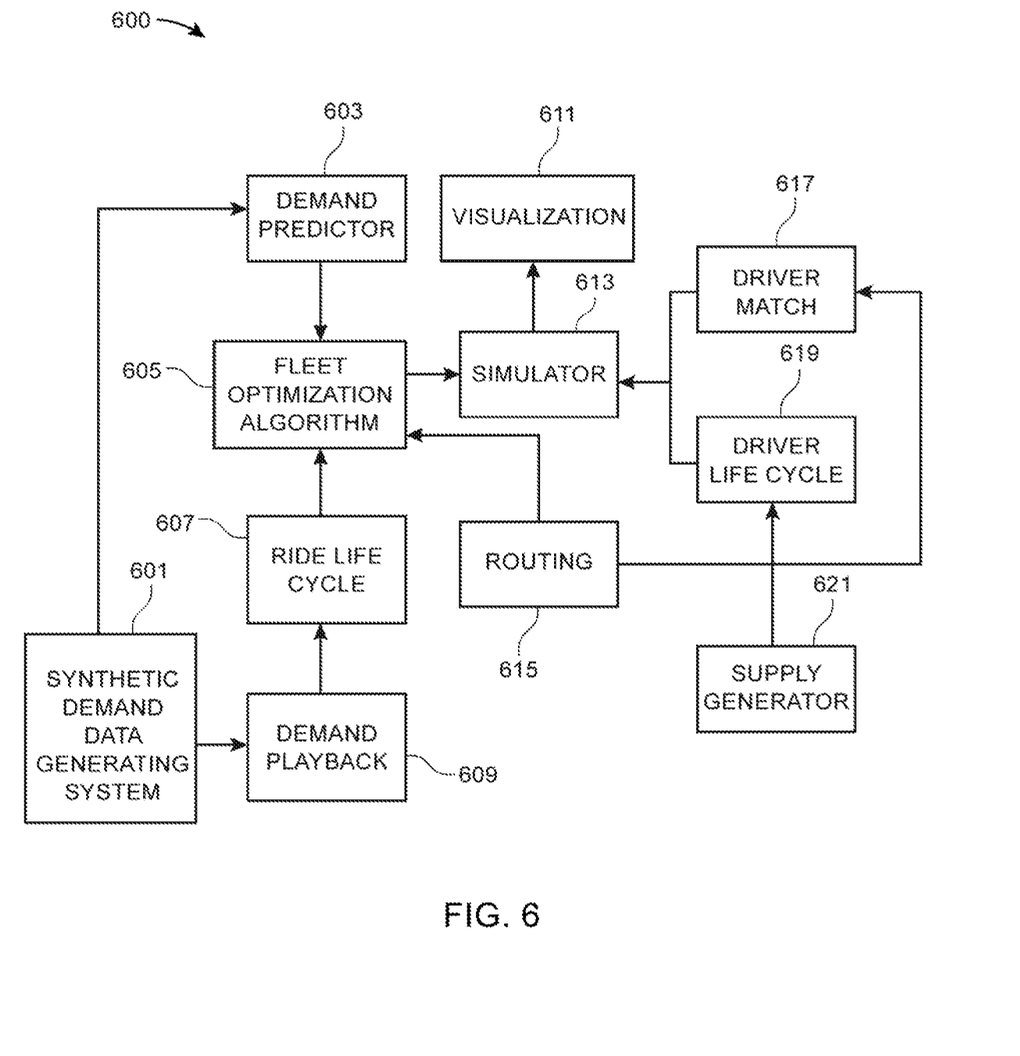
FIG. 6 illustrates a schematic block diagram of an exemplary embodiment depicting a fleet optimization simulator workflow, in accordance with one or more example embodiments.

FIG. 6 illustrates a schematic block diagram of an exemplary embodiment depicting a fleet optimization simulator workflow, in accordance with one or more example embodiments. In some example embodiments, the generated synthetic demand data corresponding to the first location may be fed into a fleet optimization simulator 613. The simulator 613 may simulate the generated synthetic demand data, may activate different fleet optimization algorithms and may evaluate performance of the system 201 in different scenarios. The block diagram 600 of FIG. 6 illustrates exemplary embodiment depicting workflow of one such exemplary fleet optimization simulator 613.

The system 201 may be a synthetic data source for the fleet optimization simulator 613. The simulator 613 may analyze output data from the system 201 and provide visualization 611 of performance of the system 201 under different scenarios utilizing different fleet optimization algorithms 605. In the workflow, the output data from the system 201 may be predicted by demand predictor 603 and validated through demand playback 609. The span of each ride 607 as per the output data from the system 201 may be determined after demand playback 609. The determination of the span of each ride may be performed by one or more state machines. To evaluate the performance of the system 201, routing 615 of vehicles as per the output data is a key feature of the simulator 613. There may be one or more essential feature of the simulator 613, such as driver match 617 and driver life cycle 619. To optimize a fleet management system, it is essential to consider driver match 617 and driver life cycle 619, which may be provided by a supply generator 621.

In this way, example embodiments of the present invention result in generation of synthetic demand data corresponding to the new city and thus, aid in efficient fleet optimization in the new city. On generation of the synthetic demand data, the system 201 may communicate the synthetic demand data to the map developer, and the map developer may update the map database 103 with the generated synthetic demand data. As a result, the updated map displaying different points of interest with estimated vehicle demand may be available in the display device 401. A cab driver may follow the updated map to efficiently optimize the cab service in a city. For example, if a cab service provider wants to launch cab service in a city where previously no such service has been run before, each cab of the cab service provider may be routed in such a way that each cab gets a new ride after completion of a previous ride without any location offset and time offset. Once a cab drops off a passenger or a group of passengers of a place (e.g. place 'x') completing a ride, driver of the cab may view the updated map and may decide which location the cab should move next in order to optimize the cab service for the passenger as well the cab service provider. Likewise, if a passenger is stuck in an unknown place, the passenger may make use of the updated map data to locate a nearby place where cab ride availability is high at that particular duration.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating synthetic demand data of vehicle rides corresponding to a first location, the method comprising:
    obtaining historic demand data of vehicle rides corresponding to a second location from a historic demand database, wherein the historic demand data comprises at least one first point of interest (POI) associated with at least one of a pick-up event or a drop-off event;
    retrieving map data associated with the second location;
    determining by a processor, at least one second POI associated with the first location;
    generating by the processor, the synthetic demand data of vehicle rides corresponding to the first location, based on the at least one first POI, the map data, and the at least one second POI; and
    updating the historic demand database with the synthetic demand data of vehicle rides corresponding to the first location,
    wherein the synthetic demand data of vehicle rides comprises at least one of first pick-up data of a first plurality of pick-up events or first drop-off data of a first plurality of drop-off events at the first location.

2. The method of claim 1, further comprising analyzing, by the processor, the historic demand data based on a clustering algorithm for generating the synthetic demand data of vehicle rides.

3. The method of claim 2, wherein the clustering algorithm is KNN algorithm.

4. The method of claim 1, wherein the historic demand data further includes time stamp and geographic location of the at least one first point of interest (POI) associated with the at least one of the pick-up event or the drop-off event.

5. The method of claim 1, further comprising:
clustering the historic demand data based on a time stamp of the at least one first POI and a category of the at least one first POI to obtain a plurality of clusters of the historic demand data; and
assigning the first location to at least one of the plurality of clusters based on an identifier of the first location.

6. The method of claim 1, further comprising generating ride data of at least one vehicle ride, based on the synthetic demand data of vehicle rides.

7. The method of claim 5, further comprising determining destination data of at least one vehicle ride based on a destination cluster from the plurality of clusters of the historic demand data and a site of the at least one second POI associated with the first location, wherein the site is associated with the destination cluster.

8. The method of claim 6, further comprising generating route data of the at least one vehicle ride, corresponding to one or more scenarios.

9. A system to generate synthetic demand data of vehicle rides corresponding to a first location, the system comprising:
at least one non-transitory memory configured to store computer program code instructions; and
at least one processor configured to execute the computer program code instructions to:
obtain historic demand data of vehicle rides corresponding to a second location from a historic demand database, wherein the historic demand data comprises at least one first point of interest (POI) associated with at least one of a pick-up event or a drop-off event;
retrieve map data associated with the second location;
determine at least one second POI associated with the first location;
generate the synthetic demand data of vehicle rides corresponding to the first location, based on the at least one first POI, the map data, and the at least one second POI; and
update the historic demand database with the synthetic demand data of vehicle rides corresponding to the first location,
wherein the synthetic demand data of vehicle rides comprises at least one of first pick-up data of a first plurality of pick-up events or first drop-off data of a first plurality of drop-off events at the first location.

10. The system of claim 9, wherein the at least one processor is further configured to analyze the historic demand data based on a clustering algorithm to generate the synthetic demand data of vehicle rides.

11. The system of claim 10, wherein the clustering algorithm is KNN algorithm.

12. The system of claim 9, wherein the historic demand data further includes time stamp and geographic location of the at least one first point of interest (POI) associated with the at least one of the pick-up event or the drop-off event.

13. The system of claim 9, wherein the at least one processor is further configured to:
cluster the historic demand data based on a time stamp and a category of the at least one first POI to obtain a plurality of clusters of the historic demand data; and
assign the first location to at least one of the plurality of clusters based on an identifier of the first location.

14. The system of claim 9, wherein the at least one processor is further configured to generate ride data of at least one vehicle ride, based on the synthetic demand data of vehicle rides.

15. The system of claim 13, wherein the at least one processor is further configured to determine destination data of at least one vehicle ride based on a destination cluster from the plurality of clusters of the historic demand data and a site of the at least one second POI associated with the first location, wherein the site is associated with the destination cluster.

16. The system of claim 14, wherein the processor is further configured to generate route data of the at least one vehicle ride corresponding to one or more scenarios.

17. A computer program product comprising at least one non-transitory computer-readable storage medium having stored thereon computer-executable program code instructions which when executed by a computer, cause the computer to carry out operations for generating synthetic demand data of vehicle rides corresponding to a first location, the operations comprising:
obtaining historic demand data of vehicle rides corresponding to a second location from a historic demand database, wherein the historic demand data comprises at least one first point of interest (POI) associated with at least one of a pick-up event or a drop-off event;
retrieving map data associated with the second location;
determining at least one second POI associated with the first location;
generating the synthetic demand data of vehicle rides corresponding to the first location, based on the at least one first POI, the map data, and the at least one second POI; and
updating the historic demand database with the synthetic demand data of vehicle rides corresponding to the first location,
wherein the synthetic demand data of vehicle rides comprises at least one of first pick-up data of a first plurality of pick-up events or first drop-off data of a first plurality of drop-off events at the first location.

18. The computer program product of claim 17, wherein the operations further comprise analyzing the historic demand data based on a clustering algorithm for generating the synthetic demand data of vehicle rides.

19. The computer program product of claim 18, wherein the clustering algorithm is KNN algorithm.

20. The computer program product of claim 17, wherein the operations further comprise:
clustering the historic demand data based on a time stamp and a category of the at least one first POI to obtain a plurality of clusters of the historic demand data; and
assigning the first location to at least one of the plurality of clusters based on an identifier of the first location.

* * * * *